(12) United States Patent
Lee et al.

(10) Patent No.: US 11,635,572 B2
(45) Date of Patent: Apr. 25, 2023

(54) APPARATUS AND METHOD FOR ETCHING OPTICAL FIBER DEVICE FOR REMOVING CLADDING LIGHT

(71) Applicant: UNIVERSITY OF SEOUL INDUSTRY COOPERATION FOUNDATION, Seoul (KR)

(72) Inventors: Ju Han Lee, Seoul (KR); Tae Yoon Kim, Seoul (KR); Kunkyu Kang, Seoul (KR); Junha Jung, Seoul (KR)

(73) Assignee: UNIVERSITY OF SEOUL INDUSTRY COOPERATION FOUNDATION, Seoul (KR)

( * ) Notice: Subject to any disclaimer, the term of this patent is extended or adjusted under 35 U.S.C. 154(b) by 0 days.

(21) Appl. No.: 17/979,218

(22) Filed: Nov. 2, 2022

(65) Prior Publication Data
US 2023/0055081 A1 Feb. 23, 2023

Related U.S. Application Data

(63) Continuation of application No. 17/191,357, filed on Mar. 3, 2021, now Pat. No. 11,531,162.

(30) Foreign Application Priority Data

Mar. 27, 2020 (KR) .......... 10-2020-0037755
Jun. 26, 2020 (KR) .......... 10-2020-0078587

(51) Int. Cl.
*G02B 6/26* (2006.01)
*C03C 25/68* (2006.01)

(52) U.S. Cl.
CPC .............. *G02B 6/262* (2013.01); *C03C 25/68* (2013.01)

(58) Field of Classification Search
CPC .................. G02B 6/262; C03C 25/68
(Continued)

(56) References Cited

U.S. PATENT DOCUMENTS 8,537,871 B2  9/2013 Saracco .......... 372/64
9,880,355 B2  1/2018 Lapointe et al.
(Continued)

FOREIGN PATENT DOCUMENTS

JP  2008-273769 A  11/2008
JP  2014-010427 A  1/2014
(Continued)

*Primary Examiner* — Jerry M Blevins
(74) *Attorney, Agent, or Firm* — Stein IP, LLC

(57) ABSTRACT

The present invention relates to an optical fiber device for removing cladding light, an apparatus and a method for etching the same. The optical fiber device comprises: a first optical fiber section through an $N^{th}$ optical fiber section arranged in sequence along a light travelling direction; and a first tapered coupling section coupling a $K^{th}$ optical fiber section and a $(K+1)^{th}$ optical fiber section, where the $K^{th}$ optical fiber section is any one of the first optical fiber section through the $N^{th}$ optical fiber section and the $(K+1)^{th}$ optical fiber section is any one of the first optical fiber section through the $N^{th}$ optical fiber section adjacent to the $K^{th}$ optical fiber section, wherein the $K^{th}$ optical fiber section comprises: at least one first subsection and at least one second subsection alternately arranged along the light travelling direction, each of the at least one first subsection having a diameter $D_{2K-1}$ and a length $L_{2K-1}$; and each of the at least one second subsection having a diameter $D_{2K}$ and a length $L_{2K}$; and a second tapered coupling section coupling the first subsection and the second subsection adjacent to the first subsection, wherein the diameter $D_{2K-1}$ and the length $L_{2K-1}$ of the first subsection and the diameter $D_{2K}$ and the length $L_{2K}$ of the second subsection of the $K^{th}$ optical fiber section and a diameter $D_{2K+1}$ and a length $L_{2K+1}$ of the first (Continued)

subsection and a diameter $D_{2K+2}$ and a length $L_{2K+2}$ of the second subsection of the $(K+1)^{th}$ optical section satisfy $D_{2K-1}>D_{2K}$, $D_{2K+1}>D_{2K+2}$, $L_{2K-1}>L_{2K+1}$, $L_{2K}>L_{2K+2}$ and $D_{2K-1}=D_{2K+1}$, and satisfy $D_{2K}>D_{2K+2}$ for odd K and $D_{2K}<D_{2K+2}$ for even K (where N is a natural number, and K is any natural number satisfying $1 \leq K \leq N-1$).

8 Claims, 17 Drawing Sheets

(58) Field of Classification Search
    USPC .......................................................... 385/43
    See application file for complete search history.

(56) References Cited

U.S. PATENT DOCUMENTS

| | | | |
|---|---|---|---|
| 10,090,631 | B2 | 10/2018 | Hou et al. |
| 2008/0267229 | A1 | 10/2008 | Kojima ............................ 372/6 |
| 2012/0127563 | A1 | 5/2012 | Farmer ....................... 359/341.3 |
| 2014/0328557 | A1 | 11/2014 | Sakai .............................. 385/12 |
| 2019/0310419 | A1* | 10/2019 | Schowengerdt ..... G02B 26/103 |
| 2020/0099190 | A1 | 3/2020 | Kokki |

FOREIGN PATENT DOCUMENTS

| | | |
|---|---|---|
| KR | 10-1139632 B1 | 5/2012 |
| KR | 10-2016-0040618 A | 4/2016 |

\* cited by examiner

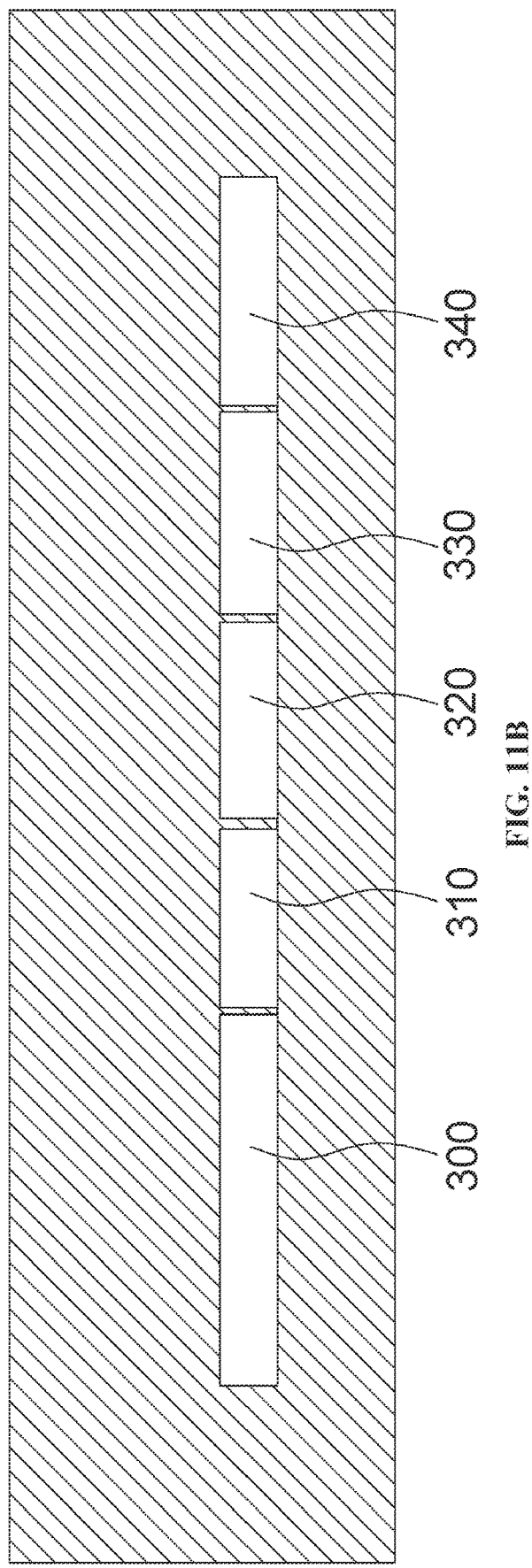

APPARATUS AND METHOD FOR ETCHING OPTICAL FIBER DEVICE FOR REMOVING CLADDING LIGHT

This application is a continuation of U.S. application Ser. No. 17/191,357, filed Mar. 3, 2021 in the U.S. Patent and Trademark Office, which claims the benefit of Korean Application Nos. 10-2020-0037755 filed Mar. 27, 2020 and 10-2020-0078587 filed Jun. 26, 2020, in the Korean Intellectual Property Office, the entire contents of which are hereby incorporated by reference.

FIELD

The present invention relates to an optical fiber device for removing cladding light, an apparatus and a method for etching the same, and more particularly, to an optical fiber device capable of efficiently releasing excessive cladding light, apparatus and method for etching the same.

DESCRIPTION OF THE RELATED ART

Conventionally, a solid state laser was used to embody a high power laser beam generator. More recently, an optical fiber is used to embody a high power laser beam generator.

A high power laser beam generator employing an optical fiber has the following advantages over solid state lasers.

First, since the optical fiber has a diameter of several hundred micrometers, it is possible to implement a high power laser beam generator with a small footprint compared to a solid state laser.

In the case of optical fibers, the gain medium may be elongated, thereby increasing surface area in contact with air per unit active volume. Therefore, heat dissipation and cooling are facilitated compared to solid state lasers. Due to this characteristic, optical fiber lasers are receiving more attention than high-power lasers which have limited high outputs due to difficulty in heat dissipation.

In addition, since optical fibers are much thinner and more flexible than solid state lasers, optical fibers are spatially advantageous when used in high power lasers. Moreover, solid state laser device is disadvantageous in that alignment, which is achieved using a lens, may easily be lost due to external shock. On the other hand, in the case of optical fiber laser, it is possible to implement laser without alignment, providing the advantage of high structural stability and portability.

Lastly, optical fiber lasers can produce high-quality beams even at high power compared to solid state lasers. By using these characteristics, a more sophisticated and effective high-power laser may be obtained.

FIG. 1 is a cross-sectional view illustrating a conventional optical fiber device and propagation of light therein.

Referring to FIG. 1, a conventional optical fiber (double-clad fiber) includes a core 20 which constitutes a path of signal beam, an inner cladding 30 surrounding the core 20 which is path of a pump beam, and an outer cladding 40 surrounding the inner cladding 30.

The pump beam is totally reflected at the boundary of the inner cladding 30 and the outer cladding 40 and amplifies the signal beam traveling along the core 20.

The pump beam remaining after amplifying the signal beam must be removed at the output stage of the laser generating device. In addition, lights leaking from the connection part (spliced part) of the optical fiber and the core 20 as well as the remaining pump beam must be removed.

A device that removes such extra light is called a cladding light stripper (CLS). When the extra light is not removed, the extra light may not only interfere with propagation of light but also cause damage to the optical fiber due to heat. Thus, the extra light must be removed.

Therefore, CLS, which is capable of removing extra light with high efficiency, is essential to manufacturing a high power laser beam generator using optical fiber.

Various methods have been proposed to manufacture CLS. A typical method of manufacturing CLS is by regularly etching the surface of an optical fiber device into a lattice.

Specifically, a method of manufacturing a optical fiber device by etching the surface of an optical fiber with a UV laser or a $CO_2$ laser or chemically etching has been proposed in Korean Patent No. 10-1139632.

The method of using a UV laser or $CO_2$ laser is disadvantageous because the method requires highly priced equipments while the method of chemically etching the surface of an optical fiber is disadvantageous in that it is difficult to control the degree of etching, and in particular, it is difficult to control the spacing of the lattice.

SUMMARY OF THE INVENTION

It is an object of the present invention to provide an optical fiber device for removing cladding light and an apparatus and a method for etching the same capable of efficiently releasing excessive cladding light.

According to one aspect of the present invention, there is provided an optical fiber device for removing cladding light, comprising: a first optical fiber section through an $N^{th}$ optical fiber section arranged in sequence along a light travelling direction; and a first tapered coupling section coupling a $K^{th}$ optical fiber section and a $(K+1)^{th}$ optical fiber section, where the $K^{th}$ optical fiber section is any one of the first optical fiber section through the $N^{th}$ optical fiber section and the (K+1) optical fiber section is any one of the first optical fiber section through the $N^{th}$ optical fiber section adjacent to the $K^{th}$ optical fiber section, wherein the $K^{th}$ optical fiber section comprises: at least one first subsection and at least one second subsection alternately arranged along the light travelling direction, each of the at least one first subsection having a diameter $D_{2K-1}$ and a length $L_{2K-1}$; and each of the at least one second subsection having a diameter $D_{2K}$ and a length $L_{2K}$; and a second tapered coupling section coupling the first subsection and the second subsection adjacent to the first subsection, wherein the diameter $D_{2K-1}$ and the length $L_{2K-1}$ of the first subsection and the diameter $D_{2K}$ and the length $L_{2K}$ of the second subsection of the $K^{th}$ optical fiber section and a diameter $D_{2K+1}$ and a length $L_{2K+1}$ of the first subsection and a diameter $D_{2K+2}$ and a length $L_{2K+2}$ of the second subsection of the $(K+1)^{th}$ optical fiber section satisfy $D_{2K-1}>D_{2K}$, $D_{2K+1}>D_{2K+2}$, $L_{2K-1}>L_{2K+1}$, $L_{2K}>L_{2K+2}$ and $D_{2K-1}=D_{2K+1}$, and satisfy $D_{2K}>D_{2K+2}$ for odd K and $D_{2K}<D_{2K+2}$ for even K (where N is a natural number, and K is any natural number satisfying $1 \leq K \leq N-1$).

It is preferable that $L_{2K-1}<L_{2K}$ is satisfied for any K.

It is preferable that $L_{2K+1}<L_{2K+2}$ is satisfied for any K.

Preferably, N is four, and the first optical fiber section is coupled to a second optical fiber section by the first tapered coupling section, the second optical fiber section is coupled to a third optical fiber section by the first tapered coupling section, and the third optical fiber section is coupled to a fourth optical fiber section by the first tapered coupling section, each of the first optical fiber section through the fourth optical fiber section comprising: the first subsection and the second subsection arranged in sequence along the light travelling direction; and the second tapered coupling section coupling the first subsection and the second subsection of each of the first optical fiber section through the fourth optical fiber section, wherein diameters $D_1$, $D_3$, $D_5$ and $D_7$ and lengths $L_1$, $L_3$, $L_5$ and $L_7$ of the first subsections and diameters $D_2$, $D_4$, $D_6$ and $D_8$ and lengths $L_2$, $L_4$, $L_6$ and $L_8$ of the second subsections of the first optical fiber section through fourth optical fiber section, respectively, satisfy $L_1 > L_3 > L_5 > L_6$, $L_2 > L_4 > L_6 > L_8$, $L_1 < L_2$, $L_3 < L_4$, $L_5 < L_6$, $L_7 < L_8$, $D_1 = D_3 = D_5 = D_7$ and $D_2 = D_6 > D_4 = D_8$.

Preferably, N is four, and the first optical fiber section is coupled to a second optical fiber section by the first tapered coupling section, the second optical fiber section is coupled to a third optical fiber section by the first tapered coupling section, and the third optical fiber section is coupled to a fourth optical fiber section by the first tapered coupling section, each of the first optical fiber section through the fourth optical fiber section comprising: two first subsection and two second subsection arranged in sequence of first subsection, second subsection, first subsection and second subsection along the light travelling direction; and three second tapered coupling section coupling the first subsection to the second subsection, the second subsection to the first subsection, and the first subsection to the second subsection in each of the first optical fiber section through the fourth optical fiber section, wherein diameters $D_1$, $D_3$, $D_5$ and $D_7$ and lengths $L_1$, $L_3$, $L_5$ and $L_7$ of the first subsections and diameters $D_2$, $D_4$, $D_6$ and $D_8$ and lengths $L_2$, $L_4$, $L_6$ and $L_8$ of the second subsections of the first optical fiber section through fourth optical fiber section, respectively, satisfy $L_1 > L_3 > L_5 > L_6$, $L_2 > L_4 > L_6 > L_8$, $L_1 < L_2$, $L_3 < L_4$, $L_5 < L_6$, $L_7 < L_8$, $D_1 = D_3 = D_5 = D_7$ and $D_2 = D_6 > D_4 = D_8$.

According to another aspect of the present invention, there is provided an apparatus for etching an optical fiber device, comprising: a main body having a first side and a second side opposite to the first side; two or more etching agent inlets for injecting an etching agent, wherein the two or more etching agent inlets are provided at the first side of the main body; two or more etching agent tanks connected to the two or more etching agent inlets, respectively, wherein the two or more etching agent tanks are provided inside the main body; an isolation plate isolating two neighboring etching agent tank of the two or more etching agent tanks; and two or more etching units connected to the two or more etching agent tanks and isolated by the isolation plate, wherein the two or more etching units are provided at the second side of the main body, wherein each of the two or more etching units comprises: one or more etch baths filled by the etching agent injected through each of the two or more etching agent inlets, wherein one or more etch baths are provided with a distance therebetween; and a groove where the optical fiber device is placed to be in contact with the etching agent in the one or more etch baths, wherein the groove is provided at an edge of each of the one or more etch baths.

Preferably, the two or more etching agent inlets is provided at a first height, and the two or more etching units is provided at a second height lower than the first height.

Preferably, two neighboring etching agent inlets of the two or more etching agent inlets are isolated by the isolation plate.

Preferably, each of the one or more etch baths is provided at a height so as to be filled with the etching agent when each of the two or more etching agent tanks is filled with the etching agent.

Preferably, the one or more etch baths of a first one of the two or more etching units are spaced apart by a first distance, the one or more etch baths of a second one of the two or more etching units neighboring the first one of the two or more etching units are spaced apart by a second distance different from the first distance.

According to yet another aspect of the present invention, there is provided method for etching an optical fiber device using an apparatus for etching the optical fiber device comprising: two or more etching agent inlets for injecting an etching agent; two or more etching agent tanks connected to the two or more etching agent inlets, respectively; an isolation plate isolating two neighboring etching agent tank of the two or more etching agent tanks; and two or more etching units connected to the two or more etching agent tanks and isolated by the isolation plate, wherein each of the two or more etching units comprises: one or more etch baths with a distance therebetween filled by the etching agent injected through each of the two or more etching agent inlets; and a groove where the optical fiber device is placed to be in contact with the etching agent in the one or more etch baths, wherein the groove is provided at an edge of each of the one or more etch baths, the method comprising: (a) placing the optical fiber device in the groove; (b) injecting the etching agent into each of the two or more etching agent inlets with a time difference therebetween; (c) etching the optical fiber device wherein time durations of etching portions of the optical fiber device by the etching agent differ depending on the time difference for each of the two or more etching units; and (d) removing etched optical fiber device from the apparatus.

Preferably, (b) comprises: (b-1) injecting the etching agent into a first one of the two or more etching agent inlets connected to the etching unit provided with the one or more etch baths having a first spacing therebetween; and (b-2) then injecting the etching agent into a second one of the two or more etching agent inlets connected to the etching unit provided with the one or more etch baths having a second spacing therebetween, the second spacing being smaller than the first spacing.

Preferably, (c) comprises: (c-1) etching a first portion of the optical fiber device placed in the grove of the etching unit provided with the one or more etch baths having the first spacing therebetween for a first time duration; and (c-2) etching a second portion of the optical fiber device placed in the grove of the etching unit provided with the one or more etch baths having the second spacing therebetween for a second time duration shorter than the first time duration.

BRIEF DESCRIPTION OF THE DRAWINGS

FIGS. 11A through 11D are cross-sectional views taken along lines G-G, H-H, I-I and J-J of FIG. 10, respectively.

DETAILED DESCRIPTION OF THE PREFERRED EMBODIMENTS

Hereinafter, an optical fiber device for removing cladding light, apparatus and method for etching the same will be described in detail with reference to the accompanying drawings.

Figure 1:
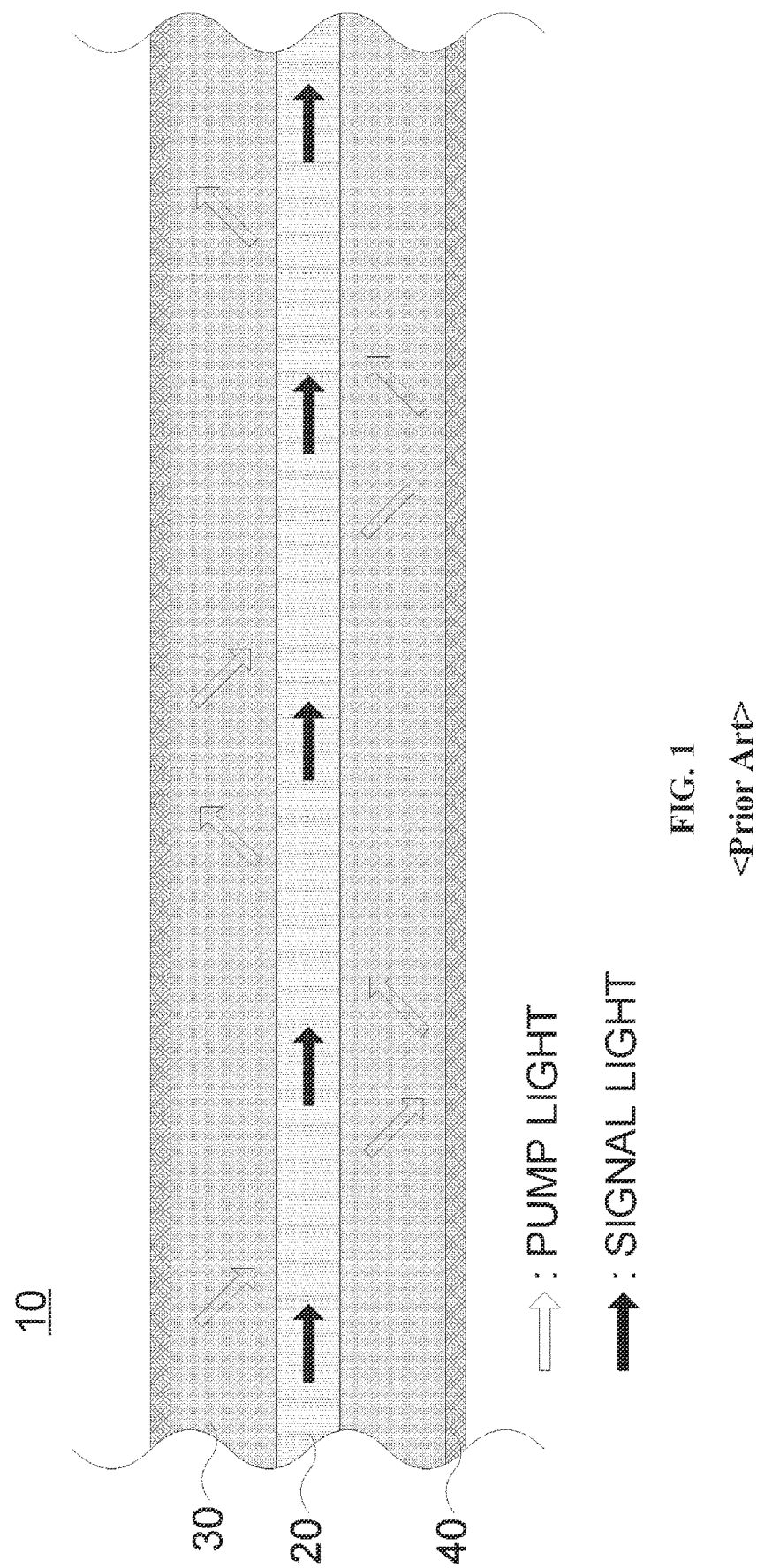
FIG. 1 is a cross-sectional view illustrating a conventional optical fiber device and propagation of light therein.
Figure 2:
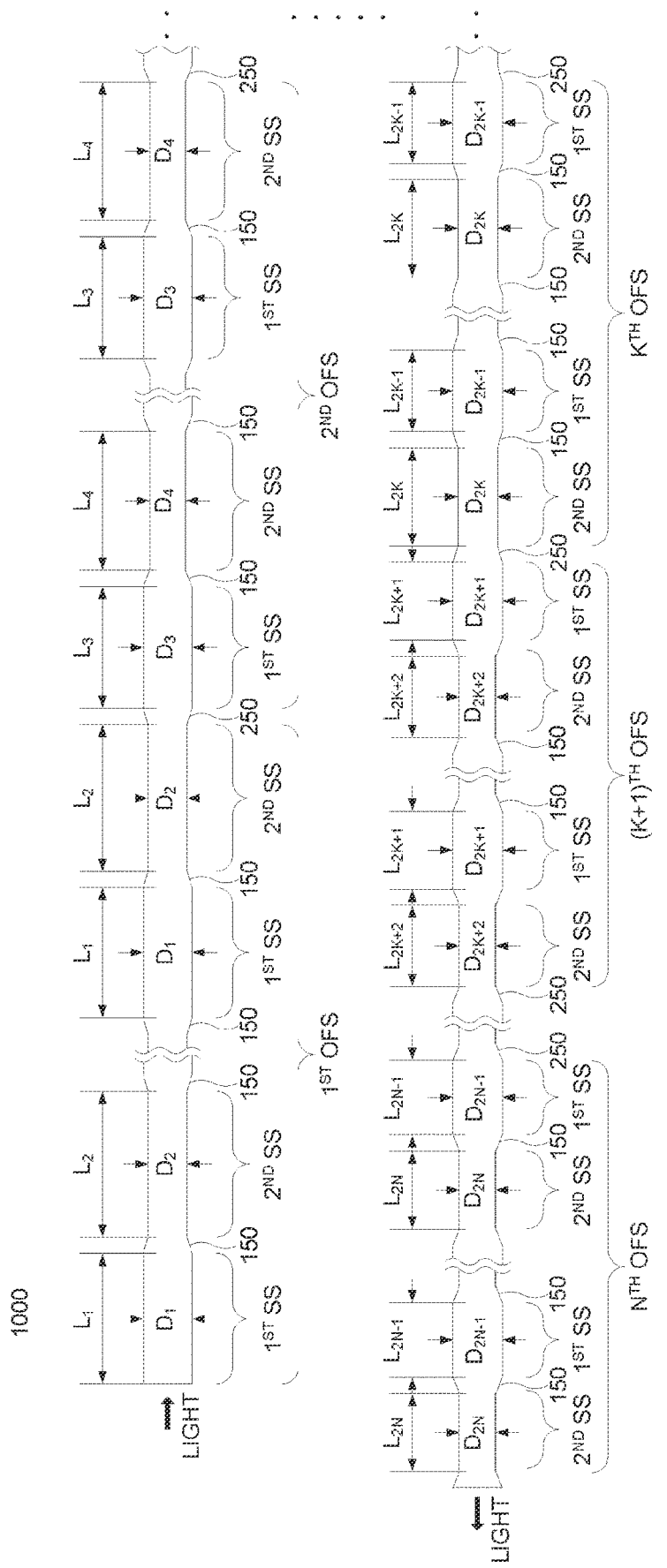
FIG. 2 is a cross-sectional view schematically illustrating an optical fiber device for removing cladding light according to the present invention.

FIG. 2 is a cross-sectional view schematically illustrating an optical fiber device for removing cladding light according to the present invention. While FIG. 2 shows an optical fiber device divided into upper and lower parts, this is to facilitate the illustration of an elongated optical fiber device, and the optical fiber device according to the present invention is actually connected as a single piece and has no disconnected part. The same is true for the optical fiber device for removing cladding light shown in FIGS. 3 and 4. In addition, in the Specification, the term "first optical fiber section", "second optical fiber section", "first section", "second section" and "tapered coupling section" are conceptually distinguished elements rather than physically distinguished elements.

Referring to FIG. 2, the optical fiber device 1000 for removing cladding light according to the present invention includes a first optical fiber section (abbreviated as "OFS" in FIG. 2) through an $N^{th}$ optical fiber section arranged in sequence along a light travelling direction denoted by arrow and "LIGHT" thereunder (where N is natural number), and first tapered coupling sections 250 coupling any two neighboring optical fiber sections of the first optical fiber section through the $N^{th}$ optical fiber section.

Specifically, the optical fiber device 1000 for removing cladding light according to the present invention includes a first optical fiber section onto which light is incident, a second optical fiber section connected to the first optical fiber section, ..., and an $N^{th}$ optical fiber section connected to the $(N-1)^{th}$ optical fiber section. In addition, two adjacent optical fiber sections are connected via a first tapered coupling section 250. For example, the first optical fiber section and the second optical fiber section are connected via the first tapered coupling section 250, and the $(N-1)^{th}$ optical fiber section and the $N^{th}$ optical fiber section are connected via the first tapered coupling section 250. (N-1) counts of first tapered coupling sections 250 are provided to connect N counts of optical fiber sections.

Each of the first optical fiber section through the $N^{th}$ optical fiber section includes a first subsection (abbreviated as "SS" in FIG. 2) and a second subsection. The first subsection and the second subsection are alternately arranged along the light travelling direction. For example, n counts of first subsection and n counts of second subsection are arranged in the order of first subsection, second subsection, ..., first subsection, second subsection (where n is a natural number).

Each of the first optical fiber section through the $N^{th}$ optical fiber section includes one or more second tapered coupling sections 150 coupling the first subsection and the second subsection. For example, as shown in FIG. 2, neighboring first subsection and second subsection are coupled via a second tapered coupling section 150, and neighboring second subsection and first subsection are coupled via another second tapered coupling section 150. Accordingly, (2n−1) counts of second tapered coupling sections 150 are provided to couple n counts of first subsections and n counts of second subsections.

Hereinafter, the first subsection and the second subsection will be described in more detail.

Hereinafter, as shown in FIG. 2, any one of the first optical fiber section through the $N^{th}$ optical fiber section will be referred to as a $K^{th}$ optical fiber section, and an optical fiber section adjacent to the $K^{th}$ optical fiber section will be referred to as a $(K+1)^{th}$ optical fiber section (where K is a natural number satisfying $1 \leq K \leq N$). Also as shown in FIG. 2, the first subsection of the $K^{th}$ optical fiber section has a diameter $D_{2K-1}$ and a length $L_{2K-1}$, and the second subsection of the $K^{th}$ optical fiber section has a diameter $D_{2K}$ and a length $L_{2K}$. Similarly, the first subsection of the $(K+1)^{th}$ optical fiber section has diameter $D_{2K+1}$ and length $L_{2K+1}$, and the second subsection of the (K+1) optical fiber section has diameter $D_{2K+2}$ and length $L_{2K+2}$.

For example, as shown in FIG. 2, when K=1, the first subsection of the first optical fiber section has diameter $D_1$ and length $L_1$, and the second subsection of the first optical fiber section has diameter $D_2$ and length $L_2$. Similarly, the first subsection of the second optical fiber section adjacent to the first optical fiber section has a diameter $D_3$ and a length $L_3$, and the second subsection of the second optical fiber section has a diameter $D_4$ and a length $L_4$.

When K=2, the first subsection of the second optical fiber section has diameter $D_3$ and length $L_3$, and the second subsection of the second optical fiber section has diameter $D_4$ and length $L_4$. Similarly, the first subsection of the third optical fiber section adjacent to the second optical fiber section has a diameter $D_5$ and a length $L_5$, and the second subsection of the third optical fiber section has a diameter $D_6$ and a length $L_6$.

When K=3, the first subsection of the third optical fiber section has diameter $D_3$ and length $L_3$, and the second subsection of the third optical fiber section has diameter $D_6$ and length $L_6$. Similarly, the first subsection of the fourth optical fiber section adjacent to the third optical fiber section has a diameter $D_7$ and a length $L_7$, and the second subsection of the fourth optical fiber section has a diameter $D_8$ and a length $L_8$.

The inventors of the present invention designed the first and second subsections of the $K^{th}$ optical fiber section and the first and second subsections of the $(K+1)^{th}$ optical fiber section as follows.

(1) The diameters and the lengths of the first subsections

The diameter of the first subsection is constant regardless of K. That is, $D_{2K-1}$ is equal to $D_{2K+1}$ (i.e. $D_{2K-1}=D_{2K+1}$) for any K (e.g. $D_1=D_3=D_5=D_7=\ldots$)

Preferably, the diameters $D_1$, $D_3$, $D_5$ and $D_7$ of the first subsections may be 120 um, respectively.

The length $L_{2K-1}$ of the first subsection of the $K^{th}$ optical fiber section is longer than the length $L_{2K+1}$ of the first subsection of the $(K+1)^{th}$ optical fiber section. That is, $L_{2K-1}$ is greater than $L_{2K+1}$ (i.e. $L_{2K+1}>L_{2K+1}$) for any K (e.g. $L_1>L_3>L_5>L_7>\ldots$).

Preferably, lengths $L_1$, $L_3$, $L_5$ and $L_7$ of the first subsection may be 1300 um, 1030 um, 770 um and 610 um, respectively.

(2) The diameters and lengths of the second subsections

The diameters of the second subsections vary according to K.

Specifically, when K is an odd number, the diameter $D_{2K}$ of the second subsection of the $K^{th}$ optical fiber section is larger than the diameter $D_{2K+2}$ of the second subsection of the $(K+1)^{th}$ optical fiber section. That is, $D_{2K}$ is greater than $D_{2K+2}$ (i.e. $D_{2K}>D_{2K+2}$) for odd number K. For example, when K=1, $D_2$ is greater than $D_4$ (i.e. $D_2>D_4$), and when K=3, $D_6$ is greater than $D_8$ (i.e. $D_6>D_8$).

When K is an even number, the diameter $D_{2K}$ of the second subsection of the $K^{th}$ optical fiber section is smaller than the diameter $D_{2K+2}$ of the second subsection of the $(K+1)^{th}$ optical fiber section. That is, $D_{2K}$ is smaller than $D_{2K+2}$ (i.e. $D_{2K}<D_{2K+2}$) for even number K. For example, when K=2, $D_4$ is smaller than $D_6$ (i.e. $D_4<D_6$), and when K=4, $D_8$ is smaller than $D_{10}$ (i.e. $D_8<D_{10}$).

According to such configuration, the diameters of the second subsection are repeated to be "large", "small", "large", "small" . . . as K increases. For example, diameters $D_2$, $D_4$, $D_6$ and $D_8$ of the second subsection may be 95 um, 90 um, 95 um and 90 um, respectively.

The length $L_{2K}$ of the second subsection of the $K^{th}$ optical fiber section is longer than the length $L_{2K+2}$ of the second subsection of the $(K+1)^{th}$ optical fiber section. That is, $L_{2K}$ is greater than $L_{2K+2}$ (i.e. $L_{2K}>L_{2K+2}$) for any K (e.g. $L_2>L_4>L_6>L_8>\ldots$).

Preferably, the lengths $L_2$, $L_4$, $L_6$ and $L_8$ of the second subsection may be 1500 um, 1250 um, 940 um and 810 um, respectively.

(3) The relationship between the diameters of the first and the second subsections The first subsection and the second subsection are coupled via the second tapered coupling section 150 having a diameter decreasing (tapered) in the light travelling direction. That is, the diameter $D_{2K-1}$ of the first subsection of the $K^{th}$ optical fiber section is larger than the diameter $D_{2K}$ of the second subsection of the $K^{th}$ optical fiber section (i.e. $D_{2K-1}>D_{2K}$). Similarly, the diameter of the first subsection $D_{2K+1}$ of the $(K+1)^{th}$ optical fiber section is larger than the diameter $D_{2K+2}$ of the second subsection of the (K+1) optical fiber section (i.e. $D_{2K+1}>D_{2K+2}$).

In the above example, when the diameters $D_1$, $D_3$, $D_5$ and $D_7$ of the first subsections are 120 um, respectively, and the diameters $D_2$, $D_4$, $D_6$ and $D_8$ of the second subsections are 95 um, 90 um, 95 um and 90 um, respectively, the relationship is satisfied.

The rougher the surface of an optical fiber device, the more back-scattering of light occurs on the surface. It is more likely that the surface gets rougher during etching as the diameter of the subsection gets smaller, and accordingly, more back-scattering may occur. The effect of back-scattering was reduced by making the diameter of the second subsection of the first optical fiber section larger than that of the second subsection of the second optical fiber section. That is, since occurrence of back-scattering in the first optical fiber section causes loss in the laser system, the second subsection $D_2$ having a relatively large diameter is provided in the first optical fiber section.

(4) The relationship between the lengths of the first and the second subsections The length $L_{2K-1}$ of the first subsection of the $K^{th}$ optical fiber section is shorter than the length $L_{2K}$ of the second subsection of the $K^{th}$ optical fiber section. That is, $L_{2K-1}$ is smaller than $L_{2K}$ (i.e. $L_{2K-1}<L_{2K}$). Similarly, the length $L_{2K+1}$ of the first subsection of the $(K+1)^{th}$ optical fiber section is shorter than the length $L_{2K+2}$ of the second subsection of the (K+1) optical fiber section. That is, $L_{2K+1}$ is smaller than $L_{2K+2}$ (i.e. $L_{2K+1}<L_{2K+2}$).

The extra light is emitted and removed through the second tapered coupling section 150 coupling the first subsection and the second subsection. In particular, by selecting the diameters and lengths of the first subsection and the second subsection to meet the conditions described above, and repeatedly disposing the second tapered coupling section 150 therebetween, extra light may be remove efficiently. As the light passes through the tapered coupling section 150, the number of total reflections of light increases, and at the same time, light of low NA is changed to light of high NA that is relatively easy to remove such that extra light may be efficiently removed.

The characteristics of the second tapered coupling section 150 are determined by the relationship between the diameters of the first and the second subsections. As the difference between the two diameters increases, the slope of the second tapered coupling section 150 increases. As the slope increases, light having a low NA is converted into light having a high NA which may be removed more easily. When the slope at the first optical fiber section is greater than the slope at the second optical fiber section, portion of light that is not removed in the first optical fiber section may be removed in the second optical fiber section. In addition, by placing a relatively gentle slope in the first optical fiber section, the light may be removed evenly from the entire optical fiber device by preventing the light from being removed at once.

Hereinafter, a first embodiment and a second embodiment according to the present invention will be described in detail with reference to FIGS. 3 and 4.

Figure 3:
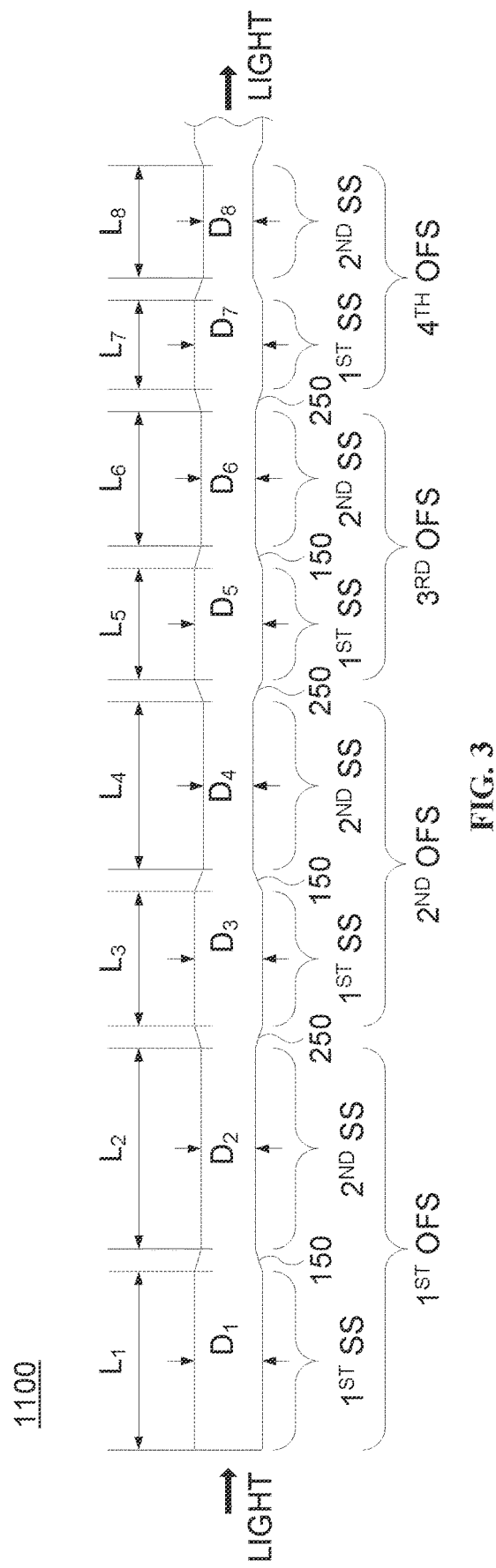
FIG. 3 is a cross-sectional view schematically illustrating a first embodiment of an optical fiber device for removing cladding light according to the present invention.

FIG. 3 is a cross-sectional view schematically illustrating a first embodiment of an optical fiber device for removing cladding light according to the present invention exemplifying the optical fiber device shown in FIG. 2 having four optical fiber sections (N=4) and each optical fiber section having one first subsection and one second subsection.

Referring to FIG. 3, an optical fiber device 1100 for removing cladding light according to the first embodiment of the present invention includes a first, a second, a third and a fourth optical fiber sections and a total of three first tapered coupling sections 250.

Each of the first optical fiber section through the fourth optical fiber section includes: one first subsection and one second subsection sequentially arranged along the light travelling direction; and a second tapered coupling section 150 that couples the first subsection and the second subsection.

The diameters $D_1$, $D_3$, $D_5$ and $D_7$ and the lengths $L_1$, $L_3$, $L_5$ and $L_7$ of the first subsections of the first optical fiber section through the fourth optical fiber section and the diameters $D_2$, $D_4$, $D_6$ and $D_8$ and the lengths $L_2$, $L_4$, $L_6$ and $L_8$ of the second subsections of the first optical fiber section through the fourth optical fiber section satisfy $L_1>L_3>L_5>L_6$, $L_2>L_4>L_6>L_8$, $L_1<L_2$, $L_3<L_4$, $L_5<L_6$, $L_7<L_8$, $D_1=D_3=D_5=D_7$ and $D_2=D_6>D_4=D_8$ according to the above-described relationships (1) through (4), That is, the diameters $D_1$, $D_3$, $D_5$ and $D_7$ of the first subsections are constant regardless of K, and the diameters $D_2$, $D_4$, $D_6$ and $D_8$ of the second subsections are arranged as "large", "small", "large", "small" depending on K (i.e. $D_2=D_6>D_4=D_8$). Further, the lengths $L_1$, $L_3$, $L_5$ and $L_7$ of the first subsections and the lengths $L_2$, $L_4$, $L_6$ and $L_8$ of the second subsections gradually decrease. The length of the second subsection of each optical fiber section is longer than the length of the first subsection of each optical fiber section (i.e. $L_1<L_2$, $L_3<L_4$, $L_5<L_6$ and $L_7<L_8$).

Figure 4:
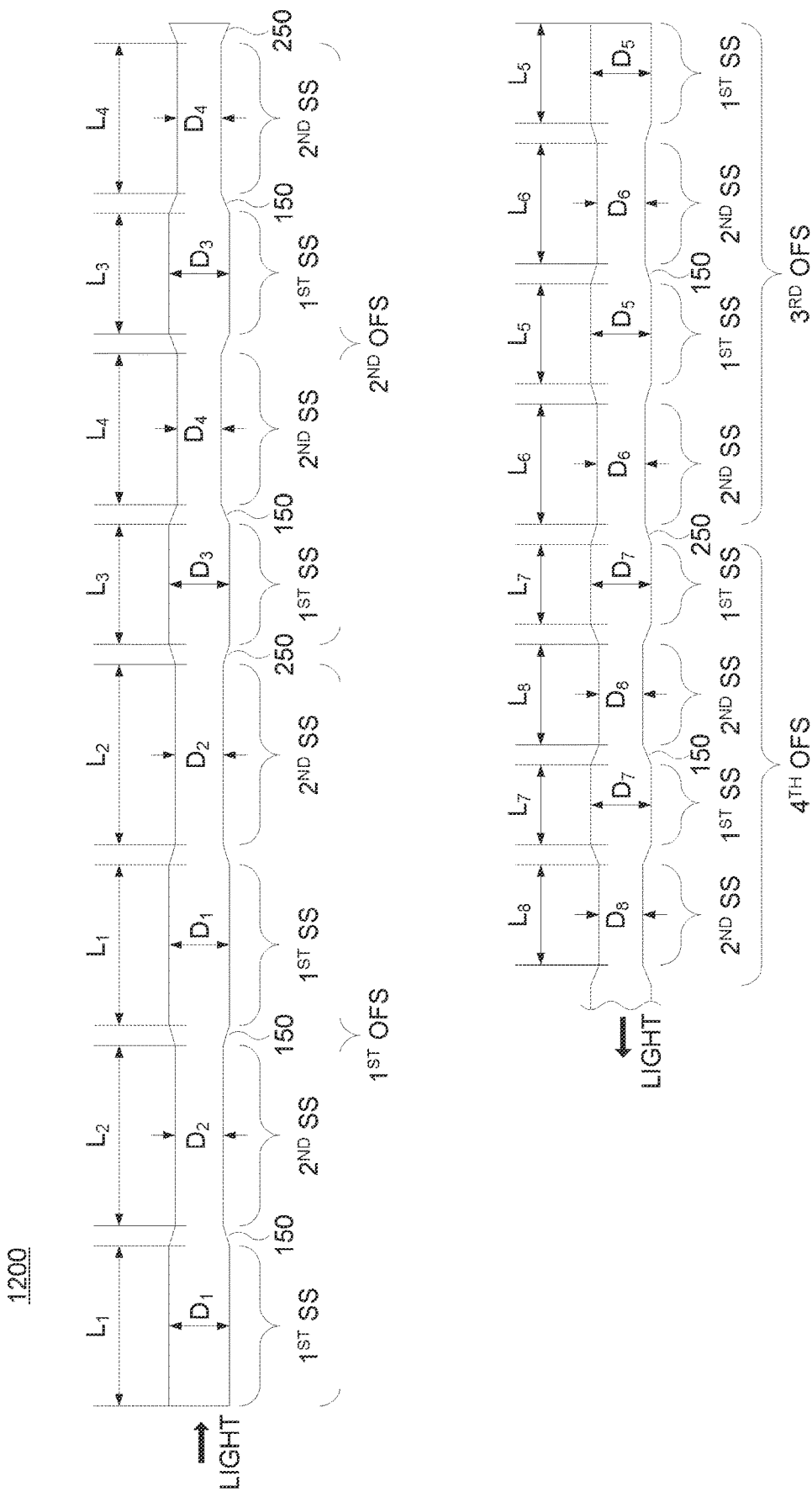
FIG. 4 is a cross-sectional view schematically illustrating a second embodiment of an optical fiber device for removing cladding light according to the present invention.

FIG. 4 is a cross-sectional view schematically illustrating a second embodiment of an optical fiber device for removing cladding light according to the present invention exemplifying the optical fiber device shown in FIG. 2 having four optical fiber sections (N=4) and each optical fiber section having two first subsections and two second subsections.

Referring to FIG. 4, an optical fiber device 1200 for removing cladding light according to the second embodiment of the present invention includes a first, a second, a third and a fourth optical fiber sections and a total of three first tapered coupling sections 250.

Each of the first optical fiber section through the fourth optical fiber section includes: two first subsection and two second subsection alternately arranged along the light traveling direction; and second tapered coupling sections 150 that couples the first subsections and the second subsections.

The diameters $D_1$, $D_3$, $D_5$ and $D_7$ and the length $L_1$, $L_3$, $L_5$ and $L_7$ of the first subsections of the first optical fiber section through the fourth optical fiber section and the diameters $D_2$, $D_4$, $D_6$ and $D_8$ and the lengths $L_2$, $L_4$, $L_6$ and $L_8$ of the second subsections of the first optical fiber section through the fourth optical fiber section satisfy $L_1>L_3>L_5>L_6$, $L_2>L_4>L_6>L_8$, $L_1<L_2$, $L_3<L_4$, $L_5<L_6$, $L_7<L_8$, $D_1=D_3=D_5=D_7$ and $D_2=D_6>D_4=D_8$ according to the above-described relationships (1) through (4), That is, the diameters $D_1$, $D_3$, $D_5$ and $D_7$ of the first subsections are constant regardless of K, and the diameters $D_2$, $D_4$, $D_6$ and $D_8$ of the second subsections are arranged as "large", "small", "large", "small" depending on K (i.e. $D_2=D_6>D_4=D_8$). Further, the lengths $L_1$, $L_3$, $L_5$ and $L_7$ of the first subsections and the lengths $L_2$, $L_4$, $L_6$ and $L_8$ of the second subsections gradually decrease. The length of the second subsection of each optical fiber section is longer than the length of the first subsection of each optical fiber section (i.e. $L_1<L_2$, $L_3<L_4$, $L_5<L_6$ and $L_7<L_8$).

Hereinafter, an apparatus for etching optical fiber and a method for etching optical fiber using the same according to the present invention will be described in detail with reference to the accompanying drawings.

Figure 5:
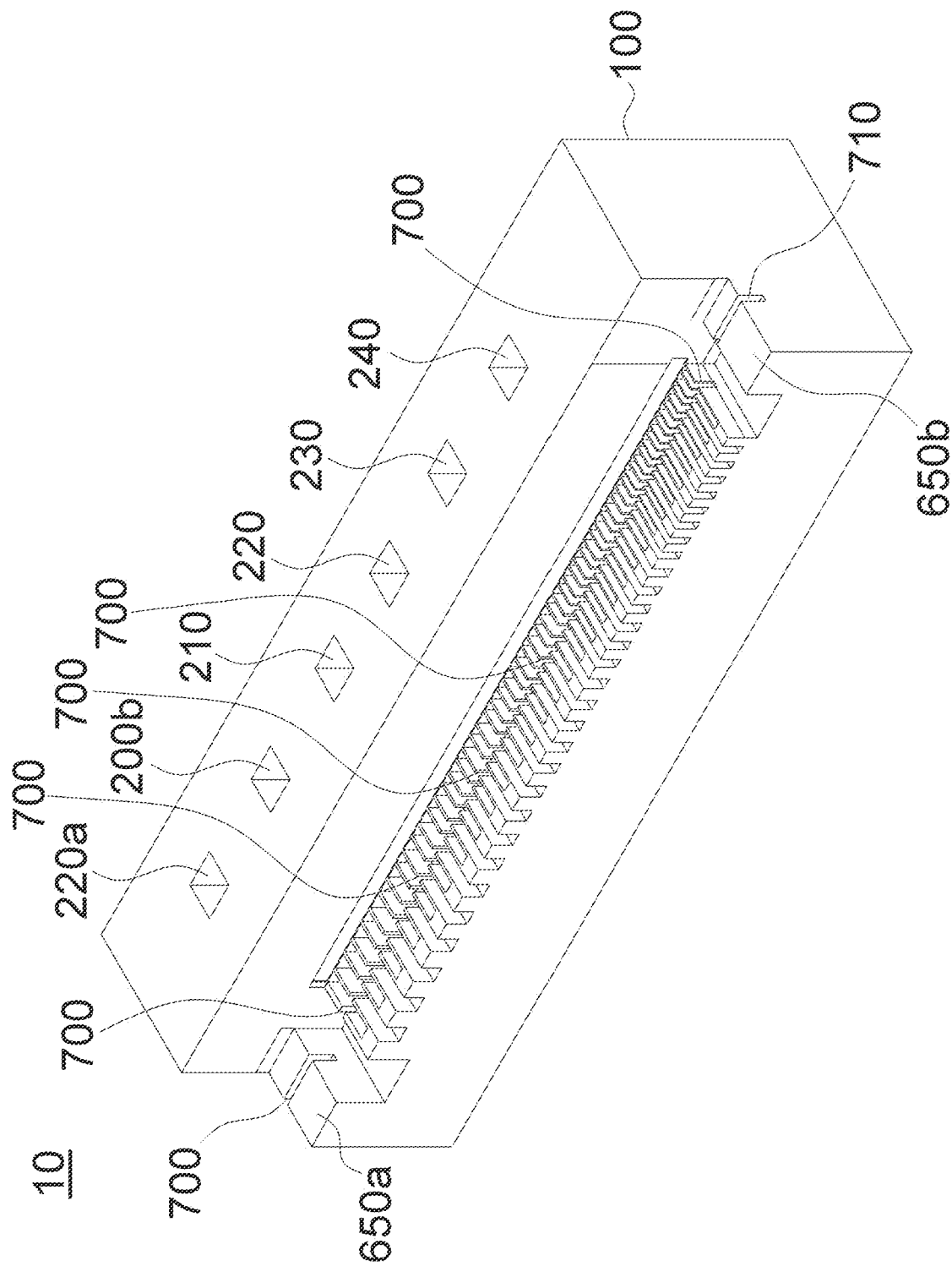
FIG. 5 is a perspective view illustrating an apparatus for etching optical fiber device according to the present invention.
Figure 6:
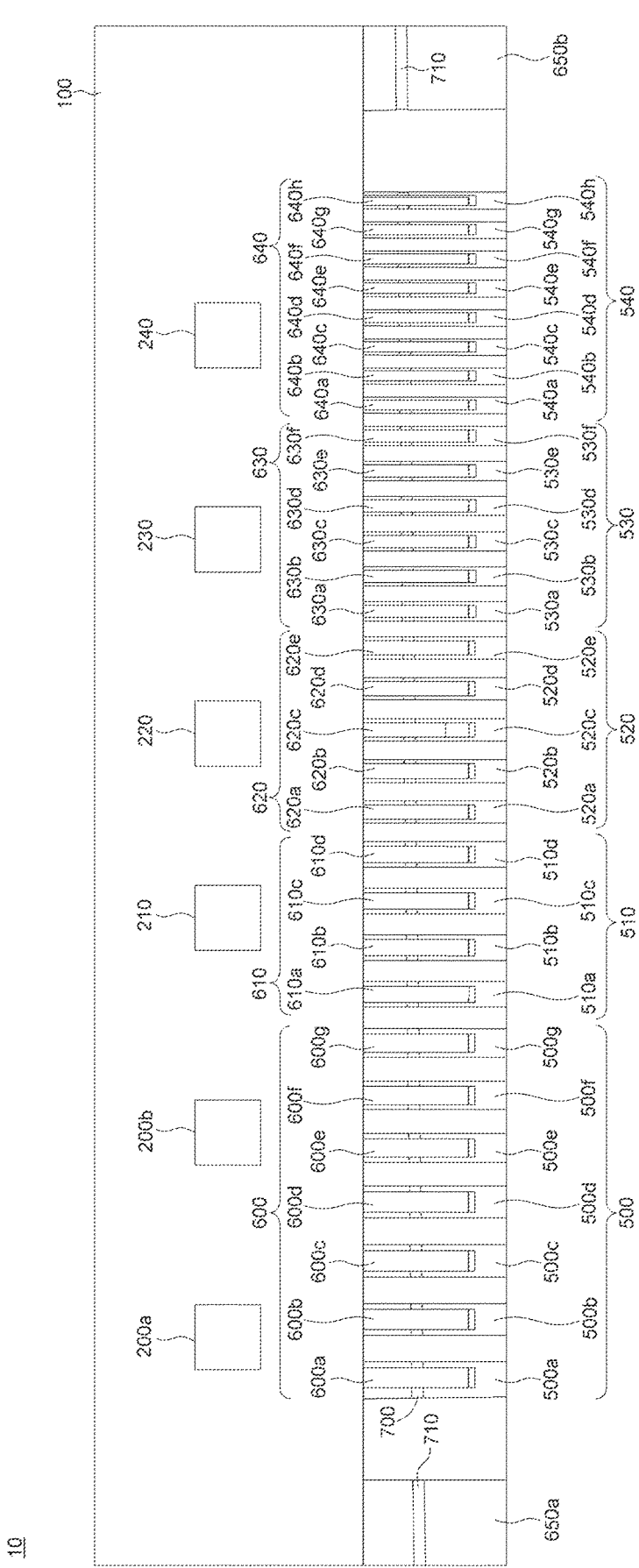
FIG. 6 is a plan view illustrating an apparatus for etching optical fiber device according to the present invention.
Figure 7:
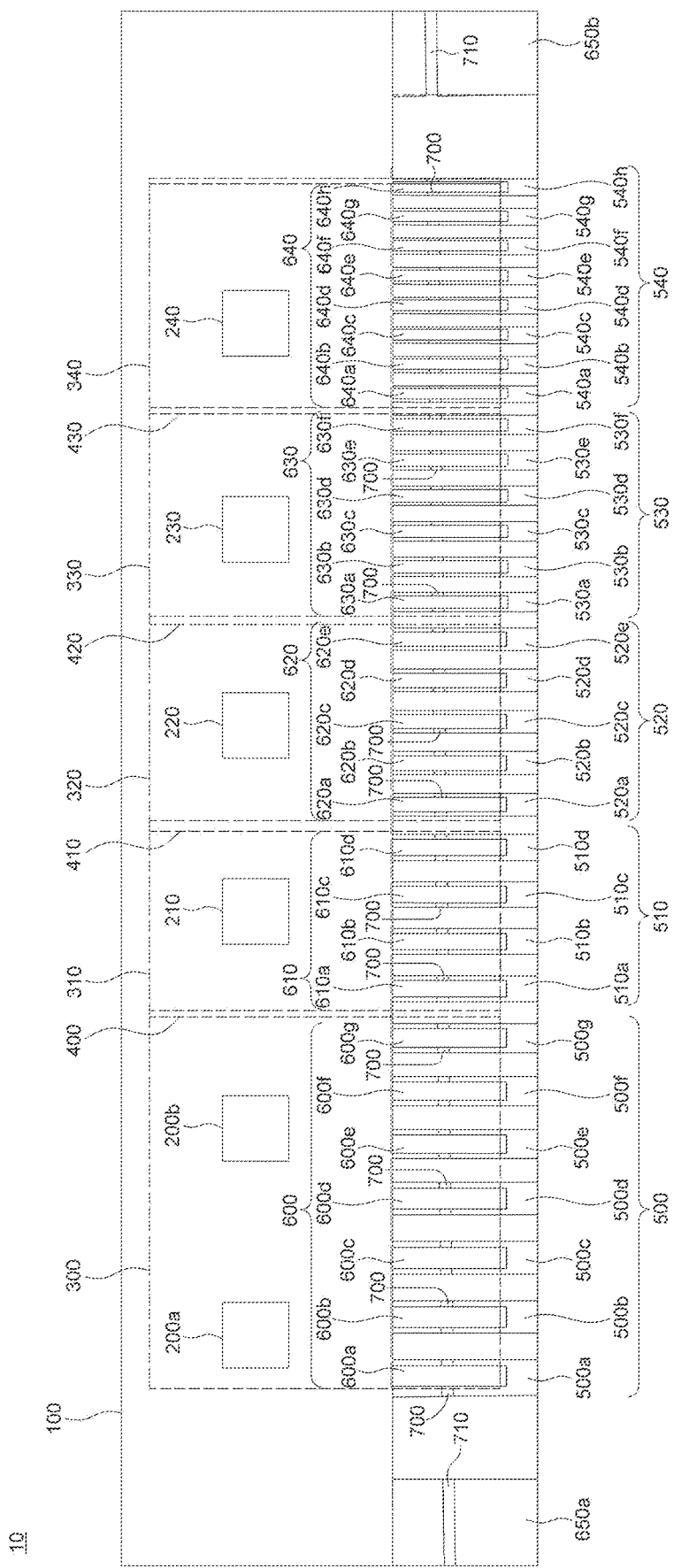
FIG. 7 is a plan perspective view illustrating an apparatus for etching optical fiber device according to the present invention.

FIGS. 5, 6 and 7 are a perspective view, a plan view and a plan perspective view, respectively, illustrating an apparatus for etching optical fiber according to the present invention.

Referring to FIGS. 5, 6 and 7, the apparatus for etching optical fiber 10 according to the present invention includes: a main body 100; two or more etching agent inlets 200a, 200b, 210, 220, 230 and 240; two or more etching agent tanks 300, 310, 320, 330 and 340; isolation plates 400, 410, 420 and 430; and etching units 500, 510, 520, 530 and 540.

The main body 100 is preferably in the shape of a step, and the two or more etching agent inlets 200a, 200b, 210, 220, 230 and 240 are provided on a first side, and an etching units 500, 510, 520, 530 and 540 are provided on a second side. However, the main body 100 is not limited to the shape of a step. Optical fiber supports 650a and 650b are provided at both ends of the main body 100, respectively, and grooves 710 are provided at each of the optical fiber supports 650a and 650b.

The two or more etching agent inlets 200a, 200b, 210, 220, 230 and 240 are provided on the first side of the main body 100 through which an etching agent is injected. Preferably, the two or more etching agent inlets 200a, 200b, 210, 220, 230 and 240 are provided at the first height to facilitate the injection of the etching agent.

The two or more etching agent inlets 200a, 200b, 210, 220, 230 and 240 are connected to two or more etching agent tanks 300, 310, 320, 330 and 340, respectively. The etching agent injected into the etching agent inlets 200a and 200b is stored in the etching agent tank 300. The etching agent injected into the etching agent inlet 210 is stored in the etching agent tank 310, the etching agent injected into the etching agent inlet 220 is stored in the etching agent tank 320, the etching agent injected into the etching agent inlet 230 is stored in the etching agent tank 330, and the etching agent injected into the etching agent inlet 240 is stored in the etching agent tank 340.

The etching agent tanks 300, 310, 320, 330 and 340 are provided inside the main body 100 and are isolated from one another by isolation plates 400, 410, 420, and 430. Specifically, the isolation plate 400 spatially isolates the two adjacent etching agent tanks 300 and 310, the isolation plate 410 spatially isolates the two adjacent etching agent tanks 310 and 320, the isolation plate 420 spatially isolates the two adjacent etching agent tanks 320 and 330, and the isolation plate 430 spatially isolates the two adjacent etching agent tanks 330 and 340.

That is, the exchange and the mixing of the etching agent in the etching agent tanks 300 and 310 are prevented by the isolation plate 400, the exchange and the mixing of the etching agent in the etching agent tanks 310 and 320 are prevented by the isolation plate 410, the exchange and the mixing of the etching agent in the etching agent tanks 320 and 330 are prevented by the isolation plate 420, and the exchange and the mixing of the etching agent in the etching agent tanks 330 and 340 are prevented by the isolation plate 430.

The etching units 500, 510, 520, 530 and 540 provided at the second side of the main body 100 are spatially connected to the etching agent tanks 300, 310, 320, 330 and 340, respectively. The etching units 500, 510, 520, 530 and 540 are provided at a second height lower than the first height at which the etching agent inlets 200a, 200b, 210, 220, 230 and 240 are provided, and the etching units 500, 510, 520, 530 and 540 spatially connected to the etching agent tanks 300, 310, 320, 330 and 340, respectively, are filled with the etching agent when the etching agent tanks 300, 310, 320, 330 and 340 are filled with the etching agent injected through the etching agent inlets 200a, 200b, 210, 220, 230 and 240, respectively.

In addition, similar to the etching agent tanks 300, 310, 320, 330 and 340, the etching units 500, 510, 520, 530 and 540 are isolated from one another by isolation plates 400, 410, 420, and 430. Specifically, the isolation plate 400 spatially isolates the two adjacent etching units 500 and 510, the isolation plate 410 spatially isolates the two adjacent etching units 510 and 520, the isolation plate 420 spatially isolates the two adjacent etching units 520 and 530, and the isolation plate 430 spatially isolates the two adjacent etching units 530 and 540.

That is, the exchange and the mixing of the etching agent in the etching units 500 and 510 are prevented by the isolation plate 400, the exchange and the mixing of the etching agent in the etching units 510 and 520 are prevented by the isolation plate 410, the exchange and the mixing of the etching agent in the etching units 520 and 530 are prevented by the isolation plate 420, and the exchange and the mixing of the etching agent in the etching units 530 and 540 are prevented by the isolation plate 430.

Hereinafter, the etching units 500, 510, 520, 530, and 540 will be described in more detail.

The etching unit 500 includes one or more etch baths 500a, 500b, 500c, 500d, 500e, 500f, and 500g spaced apart from each other at predetermined intervals. The insides 600d, 600e, 600f and 600g of the etch baths 500a, 500b, 500c, 500d, 500e, 500f, and 500g, respectively, are filled with the etching agent, and the edge of each of the etch baths 500a, 500b, 500c, 500d, 500e, 500f and 500g is provided with a groove 700 in which the optical fiber device to be etched is placed.

When an optical fiber device is placed in the grooves 700, and the insides 600a, 600b, 600c, 600d, 600e, 600f and 600g are filled with the etching agent, the optical fiber placed in the grooves 700 is etched. Specifically, when the etching agent is injected with the optical fiber placed in the groove 700, only the portions of the optical fiber over the insides 600a, 600b, 600c, 600d, 600e, 600f and 600g are etched by coming in contact with the etching agent while the portions of the optical fiber between the etch baths are not etched due to the lack of the etching agent between the etch baths.

The etching unit 510 includes one or more etch baths 510a, 510b, 510c and 510d spaced apart at a predetermined interval. The insides 610a, 610b, 610c and 610d of the etch bath 510a, 510b, 510c and 510d, respectively, are filled with the etching agent, and the edge of each of the etch baths 510a, 510b, 510c and 510d is provided with the groove 700 in which the optical fiber device to be etched is placed.

When an optical fiber device is placed in the grooves 700, and the insides 610a, 610b, 610c and 610d are filled with the etching agent, the optical fiber placed in the grooves 700 is etched. Specifically, when the etching agent is injected with the optical fiber placed in the groove 700, only the portions of the optical fiber over the insides 610a, 610b, 610c and 610d are etched by coming in contact with the etching agent while the portions of the optical fiber between the etch baths are not etched due to the lack of the etching agent between the etch baths.

The etching unit 520 includes one or more etch baths 520a, 520b, 520c, 520d and 520e spaced apart at a predetermined interval. The insides 620a, 620b, 620c, 620d and 620e of the etch baths 520a, 520b, 520c, 520d and 520e, respectively, are filled with the etching agent, and the edge of each of the etch baths 520a, 520b, 520c, 520d and 520e is provided with the groove 700 in which the optical fiber device to be etched is placed.

When an optical fiber device is placed in the grooves 700, and the insides 620a, 620b, 620c, 620d and 620e are filled with the etching agent, the optical fiber placed in the grooves 700 is etched. Specifically, when the etching agent is injected with the optical fiber placed in the groove 700, only the portions of the optical fiber over the insides 620a, 620b, 620c, 620d and 620e are etched by coming in contact with the etching agent while the portions of the optical fiber between the etch baths are not etched due to the lack of the etching agent between the etch baths.

The etching unit 530 includes one or more etch baths 530a, 530b, 530c, 530d, 530e, 530f and 530g spaced apart from each other at predetermined intervals. The insides 630a. 630b, 630c, 630d, 630e, 630f and 630g of the etch baths 530a, 530b, 530c, 530d, 530e, 530f and 530g, respectively, are filled with the etching agent, and the edge of each of the etch baths 530a, 530b, 530c, 530d, 530e, 530f and 530g is provided with the groove 700 in which the optical fiber device to be etched is placed.

When an optical fiber device is placed in the grooves 700, and the insides 630a, 630b, 630c, 630d, 630e, 630f and 630g are filled with the etching agent, the optical fiber placed in the grooves 700 is etched. Specifically, when the etching agent is injected with the optical fiber placed in the groove 700, only the portions of the optical fiber over the insides 630a, 630b, 630c, 630d, 630e, 630f and 630g are etched by coming in contact with the etching agent while the portions of the optical fiber between the etch baths are not etched due to the lack of the etching agent between the etch baths.

The etching unit 540 includes one or more etch baths 540a, 540b, 540c, 540d, 540e, 540f and 540g spaced apart from each other at predetermined intervals. The insides 640a, 640b, 640c, 640d, 640e, 640f and 640g of the etch baths 540a, 540b, 540c, 540d, 540e, 540f and 540g, respectively, are filled with the etching agent, and the edge of each of the etch baths 540a, 540b, 540c, 540d, 540e, 540f and 540g is provided with the groove 700 in which the optical fiber device to be etched is placed.

When an optical fiber device is placed in the grooves 700, and the insides 640a, 640b, 640c, 640d, 640e, 640f and 640g are filled with the etching agent, the optical fiber placed in the grooves 700 is etched. Specifically, when the etching agent is injected with the optical fiber placed in the groove 700, only the portions of the optical fiber over the insides 640a, 640b, 640c, 640d, 640e, 640f and 640g are etched by coming in contact with the etching agent while the portions of the optical fiber between the etch baths are not etched due to the lack of the etching agent between the etch baths.

The etch baths 500a through 500g, 510a through 510d, 520a through 520e, 530a through 530g and 540a through 540g are provided at a height (e.g. the second height) such that the respective etch bath connected to the etching agent tanks 300, 310, 320, 330 and 340 is also filled with the etching agent when the etching agent tanks 300, 310, 320, 330 and 340 are filled with the etching agent.

In addition, the interval at which the etch baths 500a, 500b, 500c, 500d, 500e, 500f, and 500g are arranged is preferably different from the interval at which the etch baths 510a, 510b, 510c and 510d are arranged. For example, the etching baths 500a, 500b, 500c, 500d, 500e, 500f, and 500g of the etching unit 500 may be spaced apart by a first distance while the etch baths 510a, 510b, 510c and 510d may be spaced apart by a second distance different from the first distance. Similarly, the spacing of the etch baths 500a, 500b, 500c, 500d, 500e, 500f, and 500g may differ from that of the etch baths 520a, 520b, 520c, 520d and 520e, the spacing of the etch baths 520a, 520b, 520c, 520d and 520e may differ from that of the etch baths 530a, 530b, 530c, 530d, 530e and 530f, and the spacing of the etch baths 530a, 530b, 530c, 530d, 530e and 530f may differ from that of the etch baths 540a, 540b, 540c, 540d, 540e, 540f and 540g.

Figure 8:
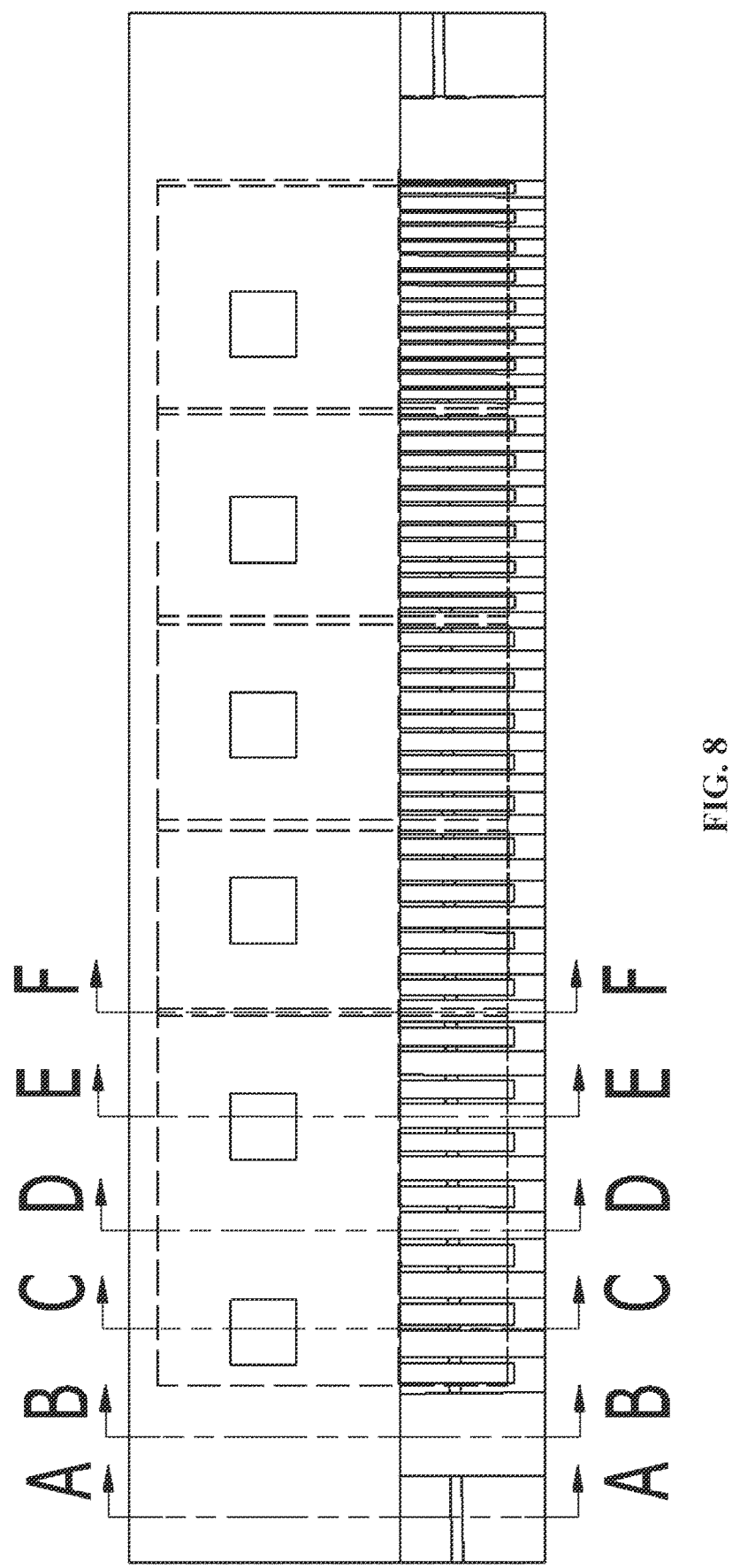
FIG. 8 is a plan perspective view illustrating the apparatus for etching optical fiber according to the present invention.

FIG. 8 is a plan perspective view illustrating the apparatus for etching optical fiber according to the present invention, and FIGS. 9A through 9F are cross-sectional views taken along lines A-A, B-B, C-C, D-D, E-E and F-F of FIG. 8, respectively.

Figure 9A:
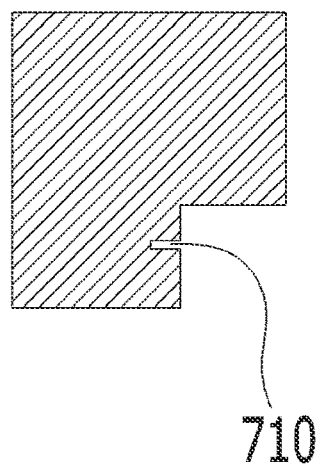
FIGS. 9A through 9F are cross-sectional views taken along lines A-A, B-B, C-C, D-D, E-E and F-F of FIG. 8, respectively.
Figure 9B:
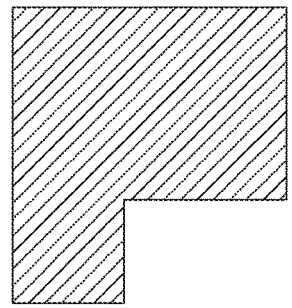
Figure 9C:
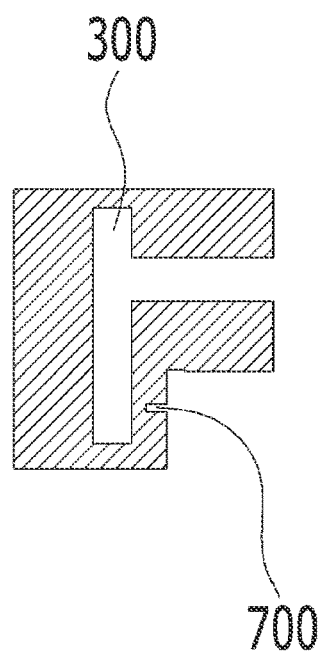
Figure 9D:
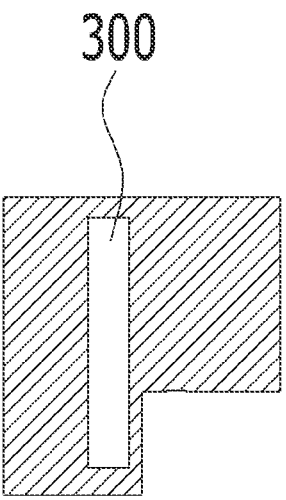
Figure 9E:
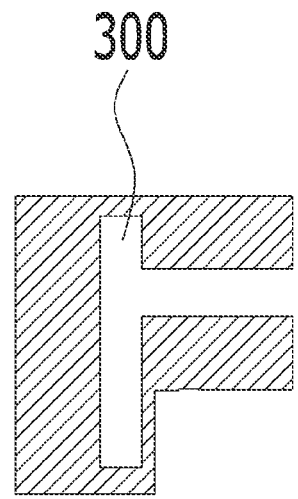
Figure 9F:
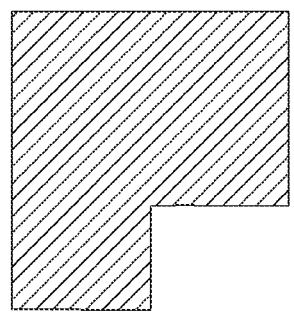

Specifically, FIG. 9A is a cross-sectional view of the support 650a, and FIG. 9b is a cross-sectional view of a portion between the support 650a and the etching unit 500. FIG. 9C is a cross-sectional view of a portion where the etch bath 500b is provided, and FIG. 9D is a cross-sectional view of a portion between the etch baths 500c and 500d. FIG. 9E is a cross-sectional view of a portion where the etching agent inlet 200b is provided, and FIG. 9F is a cross-sectional view of a portion where the isolation plate 400 is provided. As shown in FIG. 9F, the etching agent tanks 300 and 310 are completely isolated from each other by the isolation plate 400.

Figure 10:
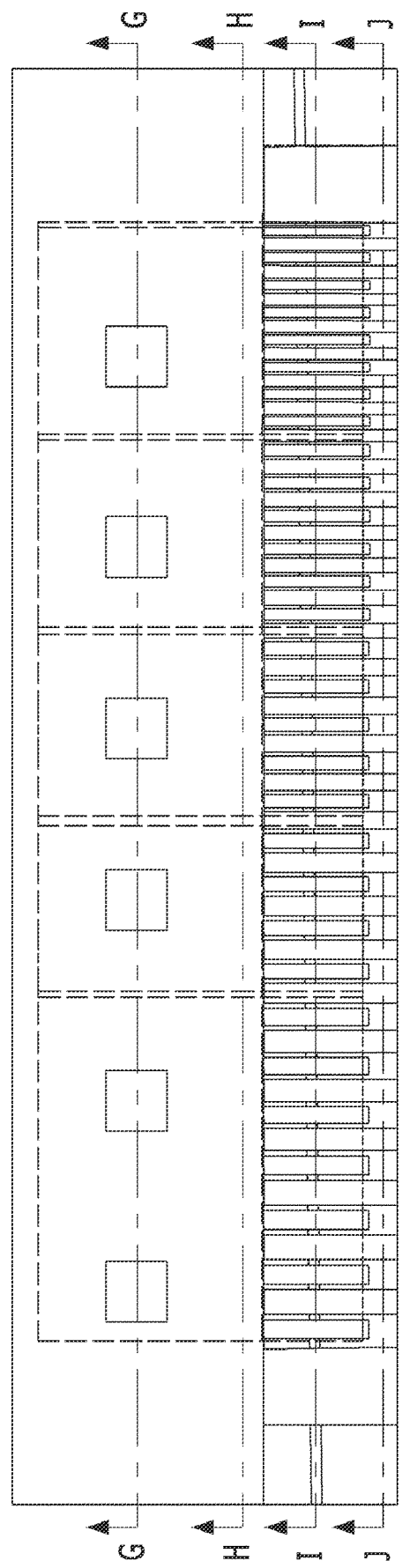
FIG. 10 is a plan perspective view illustrating an apparatus for etching optical fiber according to the present invention.
Figure 11A:
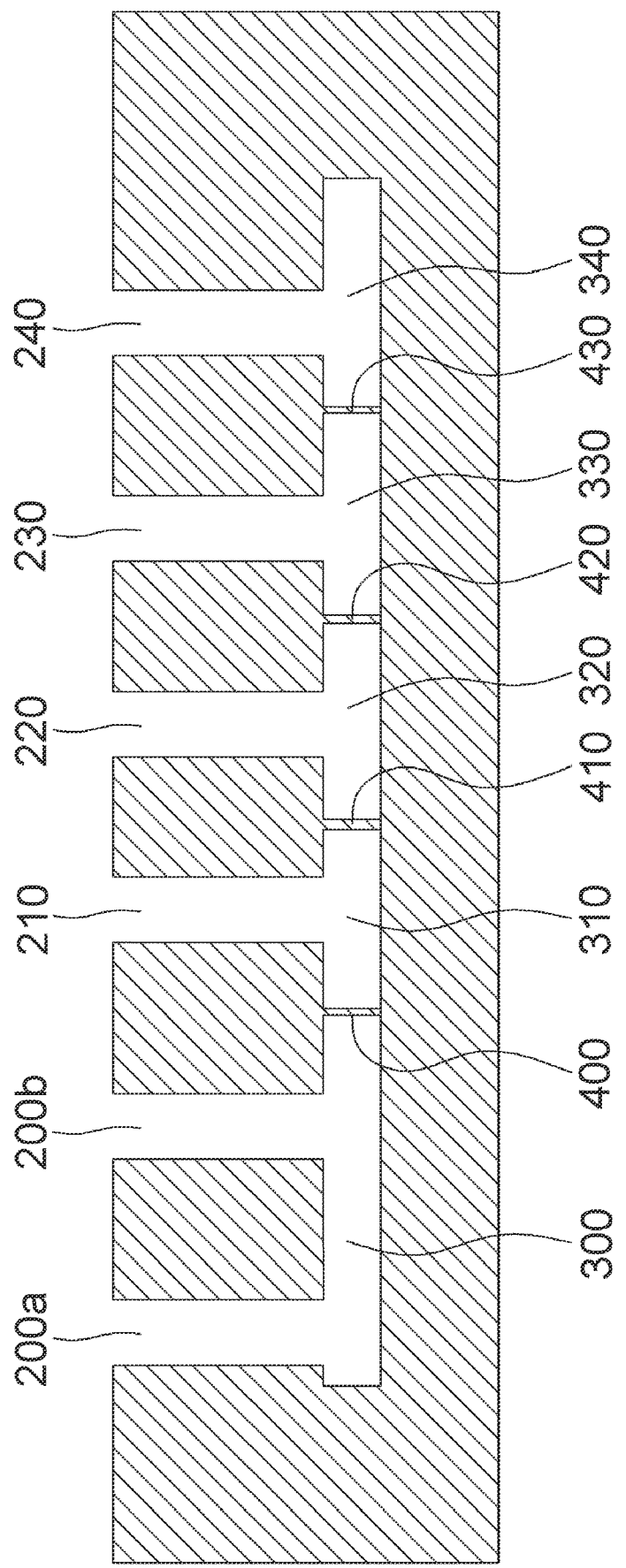
Figure 11C:
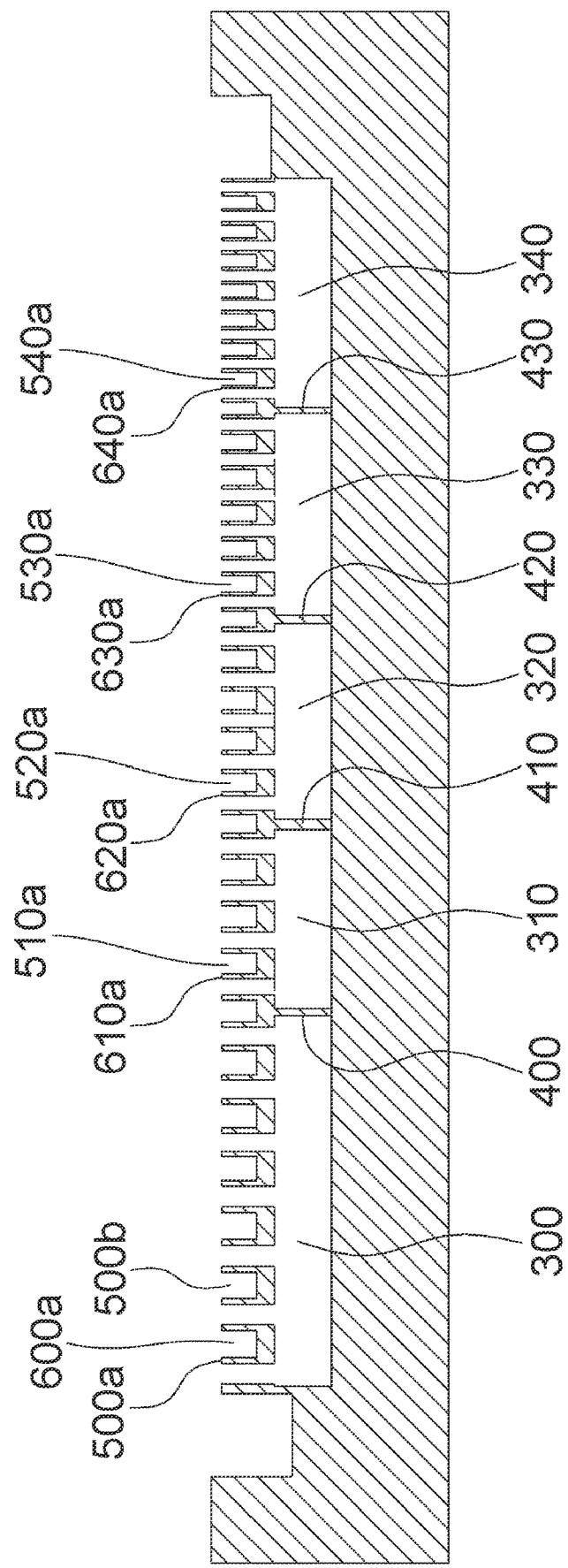
Figure 11D:
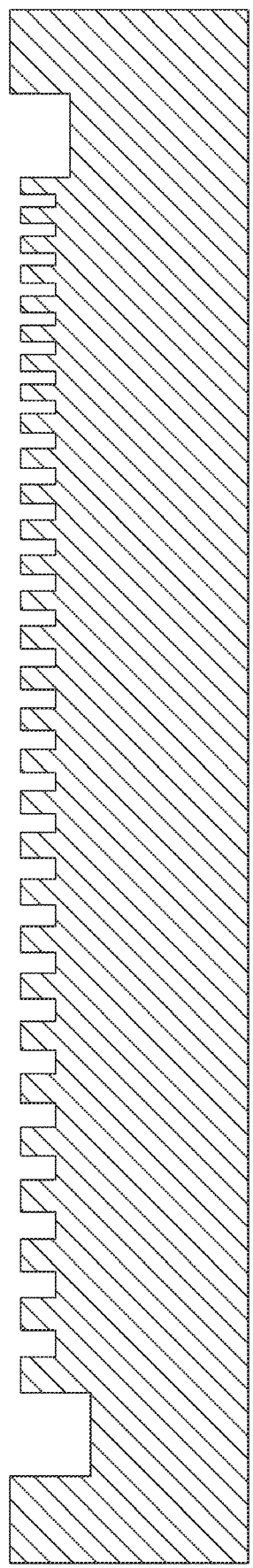

FIG. 10 is a plan perspective view illustrating an apparatus for etching optical fiber according to the present invention, and FIGS. 11A through 11D are cross-sectional views taken along lines G-G, H-H, I-I and J-J of FIG. 10, respectively.

Referring to FIGS. 11A through 11D, the etching agent tanks 300, 310, 320, 330 and 340 are completely isolated from one another by isolation plates 400, 410, 420 and 430. Similarly, the etching units 500, 510, 520, 530 and 540 connected to the etching agent tanks 300, 310, 320, 330 and 340 are also completely isolated from one another by the isolation plates 400, 410, 420, 430.

Hereinafter, a method for etching optical fiber device according to the present invention will be described in detail with reference to FIG. 12.

The method for etching optical fiber device according to the present invention is performed using the apparatus for etching optical fiber device shown in FIG. 5.

Figure 12:
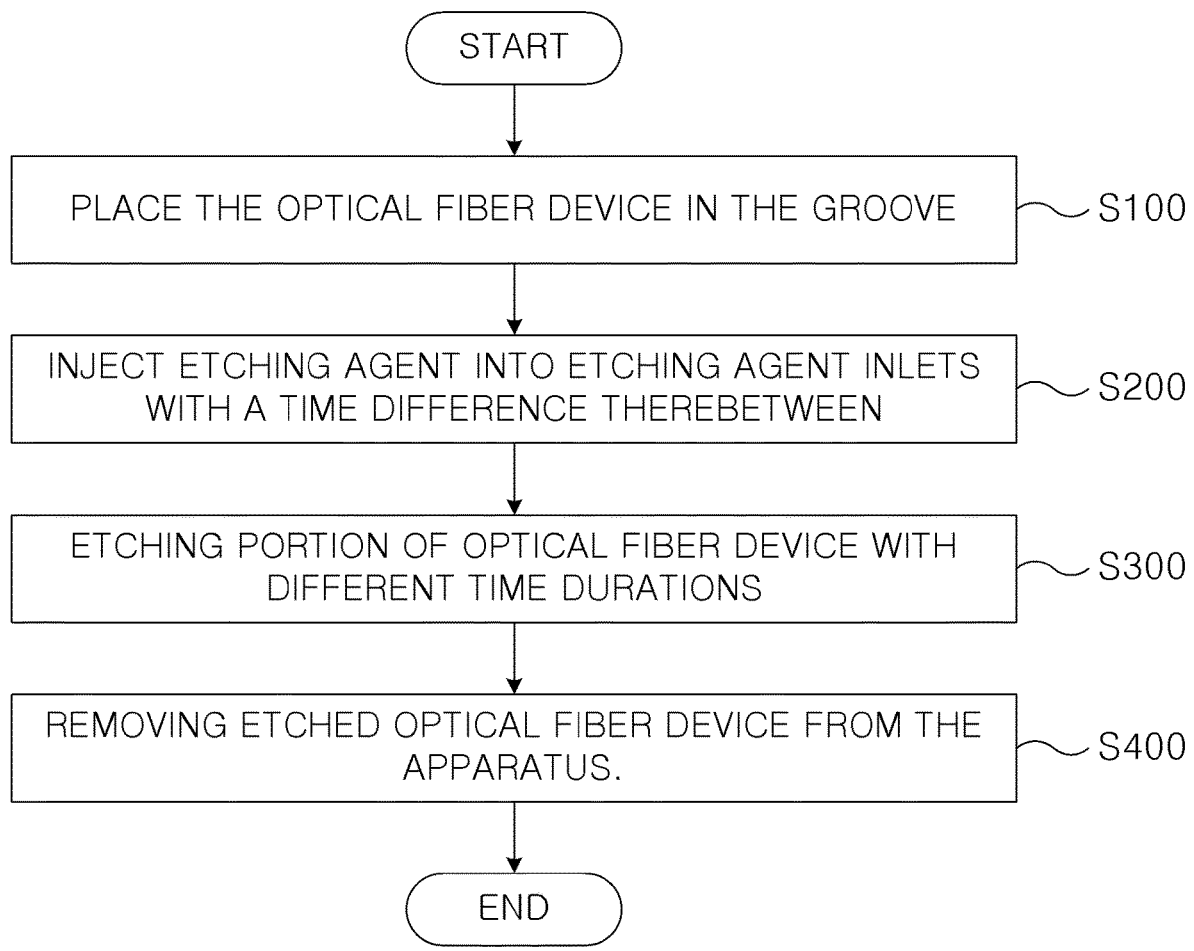
FIG. 12 is a flow chart illustrating a method for etching optical fiber device according to the present invention.

FIG. 12 is a flow chart illustrating the method for etching optical fiber device according to the present invention.

Referring to FIG. 12, the optical fiber device is placed in the grooves 700 and 710 of the apparatus for etching optical fiber device shown in FIG. 5 (S100). The apparatus for etching optical fiber device shown in FIG. 5 includes a plurality of grooves 700 and 710, and all of the grooves 700 and 710 are aligned so that a linear optical fiber device can be placed.

Thereafter, an etching agent is injected into the etching agent inlets 200a, 200b, 210, 220, 230 and 240 shown in FIG. 5 with a predetermined time difference for each etching agent inlet (S200). The reason for injecting the etching agent with a predetermined time difference for each etching agent inlet is to vary the degree of etching of the optical fiber device.

Hereinafter, the step S200 will be described in detail with reference to FIG. 13.

Figure 13:
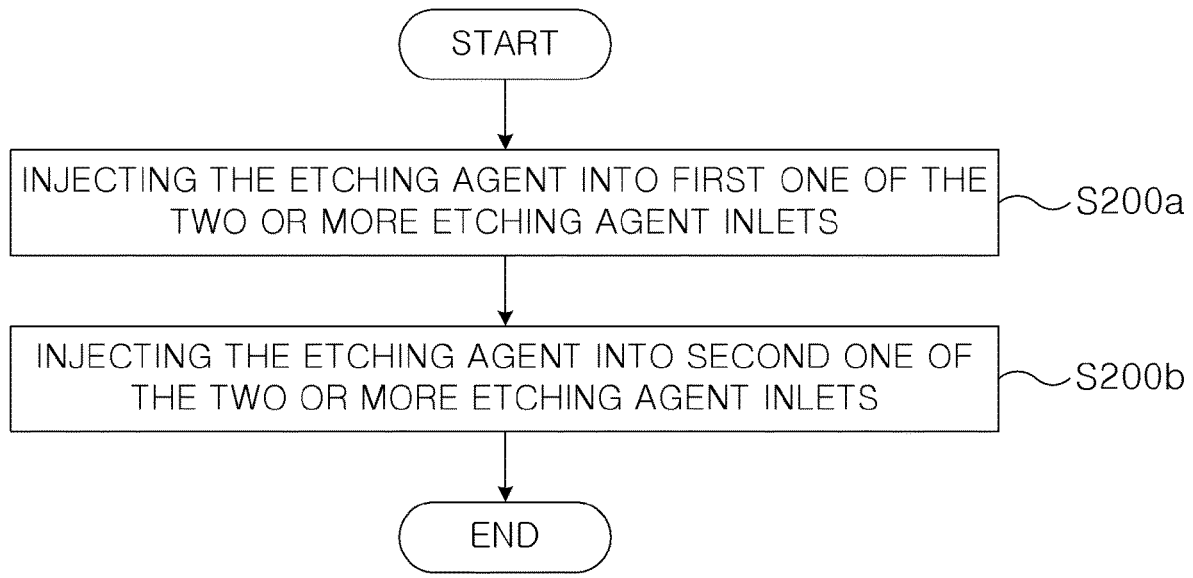
FIG. 13 is a flow chart illustrating step S200 of the method according to the present invention shown in FIG. 12.

FIG. 13 is a flow chart illustrating in detail the step S200 of the method according to the present invention shown in FIG. 12.

As shown in FIG. 13, the etching agent is injected into a first one of the two or more etching agent inlets connected to the etching unit provided with the one or more etch baths having a first spacing therebetween (S200a).

Thereafter, the etching agent is injected into a second one of the two or more etching agent inlets connected to the etching unit provided with the one or more etch baths having a second spacing therebetween, wherein the second spacing is smaller than the first spacing (S200b).

For example, the etching agent is injected into the etching agent inlets 200a and 200b connected to the etching unit 500 provided with the etch baths with relatively large spacing therebetween to fill the etching unit 500 first with the etching agent via the etching agent tank 300. Accordingly, the portion of the optical fiber device placed on the etching unit 500 is subjected to etching first. Thereafter, the etching agent is injected into the etching agent inlet 210 connected to the etching unit 501 provided with the etch baths relatively small spacing therebetween to fill the etching unit 510 second with the etching agent via the etching agent tank 310. Accordingly, the portion of the optical fiber device placed on the etching unit 510 is subjected to etching next. Since the portion of the optical fiber device placed on the etching unit 500 is etched first, the degree of etching of the optical fiber device placed on the etching unit 500 is greater than the degree of etching of the optical fiber device placed on the etching unit 510.

Similarly, when the etching agent is injected into the etching agent inlets 220, 230 and 240 in sequence, the degree of etching of the portion of the optical fiber device placed on the etching units 520 is greater than that of the portion of the optical fiber device placed on the etching units 530, and the degree of etching of the portion of the optical fiber device placed on the etching units 530 is greater than that of the portion of the optical fiber device placed on the etching units 540. That is, the degrees of etching of the portions of the optical fiber device vary depending on the order of the injection of the etching agent into agent inlets 220, 230 and 240. Here, the order of the injection of the etching agent is not limited to the example described above. For example, of the etching agent may be injected at the same time, the order of the injection of the etching agent may be changed as desired, the time interval between the injections may be adjusted as desired. That is, the order of the injection and the time interval between the injections may be selected as desired depending on which portion of the optical fiber device is to be etched more.

Thereafter, the portions of the optical fiber device are etched for different etching time periods according to the time difference (S300).

Hereinafter, the step S300 will be described in detail with reference to FIG. 14.

Figure 14:
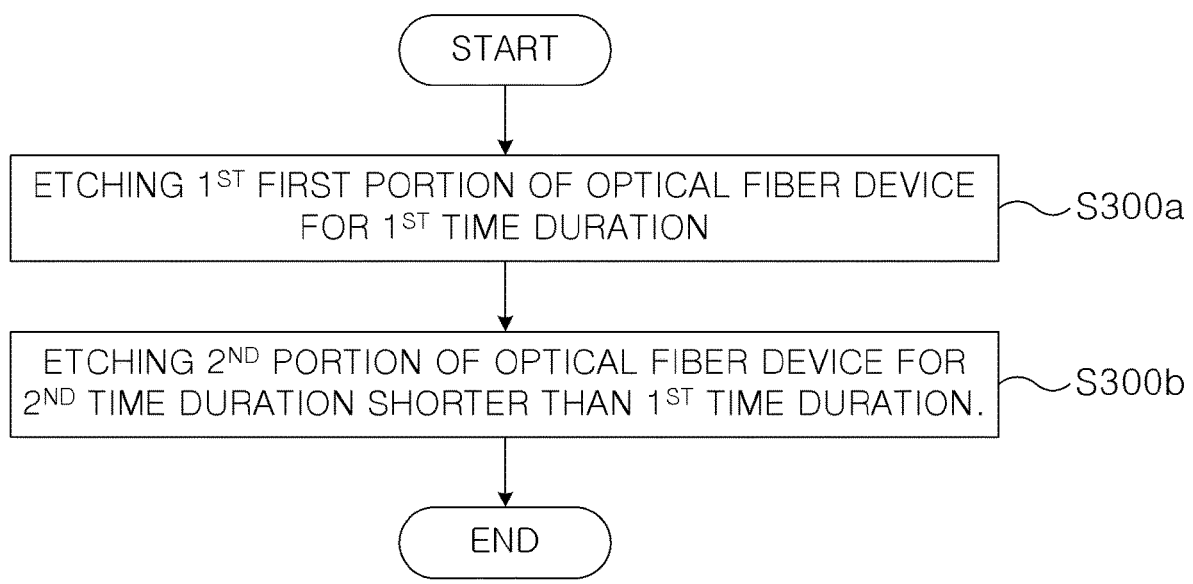
FIG. 14 is a flow chart illustrating step S300 of the method according to the present invention shown in FIG. 12.

FIG. 14 is a flow chart illustrating step S300 of the method according to the present invention shown in FIG. 12.

Referring to FIG. 14, a first portion of the optical fiber device placed in the grove of the etching unit provided with the one or more etch baths having the first spacing therebetween is etched for a first time duration (S300a). A second portion of the optical fiber device placed in the grove of the etching unit provided with the one or more etch baths having the second spacing therebetween is etched for a second time duration shorter than the first time duration (S300b).

As described above, when the etching agent is sequentially injected, the portion of the optical fiber device placed on the etching unit into which the etching agent is injected first is subjected to etching first. The time duration of etching may be selected as desired after all the etching units are filled with the etching agent.

For example, when the etching agent is first injected into the etching agent inlets 200a and 200b, and the etching agent is then injected into the etching agent inlet 210, the time duration of etching of the portion of the optical fiber device placed in the groove of the etching unit 500 having the etch baths with a relatively large spacing is longer than that of the portion of the optical fiber device placed in the groove of the etching unit 510 having the etch baths with a relatively small spacing.

The etching agent may be chosen based on the degree of etching, shape and time. In order to prevent the etching agent from leaking through the groove 700 and to uniformly etch the surface of the optical fiber, it is preferable that the surface tension of the etching agent is greater than 60 dyn/cm and smaller than the surface tension of water (75.6460 dyn/cm at 0° C.). For example, a mixture solution of two or more of sulfamic acid, ammonium fluoride, distilled water, and ammonium sulfate may be used as the etching agent.

Thereafter, the optical fiber device that has been etched is removed from the optical fiber device etching apparatus (S400). When the etching is completed, the optical fiber device for removing cladding light shown in FIG. 2 is obtained.

The optical fiber device for removing cladding light, the apparatus and the method for etching optical fiber device according to the present invention have the following advantageous effects.

(1) The excess light may be efficiently removed by repeatedly provided the tapered coupling section.

(2) The damage by heat from the light may be prevented by appropriately adjusting the lengths of the first and the second subsections.

(3) The surface area of the tapered coupling section may be increased by appropriately adjusting the diameters of the first and the second subsections to efficiently remove the excess light.

(4) The time duration for etching of the portions of the optical fiber may be precisely controlled by injecting the etching agent with time differences.

(5) The optical fiber device having a desired shape may be manufactured since the optical fiber device may be partially etched as desired.

What is claimed is:

1. An apparatus for etching an optical fiber device, comprising:
    a main body having a first side and a second side opposite to the first side;
    two or more etching agent inlets for injecting an etching agent, wherein the two or more etching agent inlets are provided at the first side of the main body;
    two or more etching agent tanks connected to the two or more etching agent inlets, respectively, wherein the two or more etching agent tanks are provided inside the main body;
    an isolation plate isolating two neighboring etching agent tank of the two or more etching agent tanks; and
    two or more etching units connected to the two or more etching agent tanks and isolated by the isolation plate, wherein the two or more etching units are provided at the second side of the main body,
    wherein each of the two or more etching units comprises:
    one or more etch baths filled by the etching agent injected through each of the two or more etching agent inlets, wherein one or more etch baths are provided with a distance therebetween; and
    a groove where the optical fiber device is placed to be in contact with the etching agent in the one or more etch baths, wherein the groove is provided at an edge of each of the one or more etch baths.

2. The apparatus of claim 1, wherein the two or more etching agent inlets is provided at a first height, and the two or more etching units is provided at a second height lower than the first height.

3. The apparatus of claim 1, wherein two neighboring etching agent inlets of the two or more etching agent inlets are isolated by the isolation plate.

4. The apparatus of claim 1, wherein each of the one or more etch baths is provided at a height so as to be filled with the etching agent when each of the two or more etching agent tanks is filled with the etching agent.

5. The apparatus of claim 1, wherein the one or more etch baths of a first one of the two or more etching units are spaced apart by a first distance, the one or more etch baths of a second one of the two or more etching units neighboring the first one of the two or more etching units are spaced apart by a second distance different from the first distance.

6. A method for etching an optical fiber device using an apparatus for etching the optical fiber device comprising: two or more etching agent inlets for injecting an etching agent; two or more etching agent tanks connected to the two or more etching agent inlets, respectively; an isolation plate isolating two neighboring etching agent tank of the two or more etching agent tanks; and two or more etching units connected to the two or more etching agent tanks and isolated by the isolation plate, wherein each of the two or more etching units comprises: one or more etch baths with a distance therebetween filled by the etching agent injected through each of the two or more etching agent inlets; and a groove where the optical fiber device is placed to be in contact with the etching agent in the one or more etch baths, wherein the groove is provided at an edge of each of the one or more etch baths, the method comprising:

(a) placing the optical fiber device in the groove;
    (b) injecting the etching agent into each of the two or more etching agent inlets with a time difference therebetween;
    (c) etching the optical fiber device wherein time durations of etching portions of the optical fiber device by the etching agent differ depending on the time difference for each of the two or more etching units; and
    (d) removing etched optical fiber device from the apparatus.

7. The method of claim 6, wherein (b) comprises: (b-1) injecting the etching agent into a first one of the two or more etching agent inlets connected to the etching unit provided with the one or more etch baths having a first spacing therebetween; and (b-2) then injecting the etching agent into a second one of the two or more etching agent inlets connected to the etching unit provided with the one or more etch baths having a second spacing therebetween, the second spacing being smaller than the first spacing.

8. The method of claim 7, wherein (c) comprises: (c-1) etching a first portion of the optical fiber device placed in the grove of the etching unit provided with the one or more etch baths having the first spacing therebetween for a first time duration; and (c-2) etching a second portion of the optical fiber device placed in the grove of the etching unit provided with the one or more etch baths having the second spacing therebetween for a second time duration shorter than the first time duration.

* * * * *